United States Patent
Paul et al.

(10) Patent No.: US 10,021,073 B2
(45) Date of Patent: *Jul. 10, 2018

(54) SYSTEMS AND METHODS FOR DELIVERING MESSAGES OVER A NETWORK

(71) Applicant: SLING MEDIA INC., Foster City, CA (US)

(72) Inventors: John Michael Paul, Palo Alto, CA (US); Mark David Melin, Brisbane, CA (US); Sylvain Jack Niles, San Francisco, CA (US); Myles Patrick Cagney, Novato, CA (US)

(73) Assignee: Sling Media L.L.C., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/680,717

(22) Filed: Apr. 7, 2015

(65) Prior Publication Data

US 2015/0215284 A1    Jul. 30, 2015

Related U.S. Application Data

(63) Continuation of application No. 12/619,192, filed on Nov. 16, 2009, now Pat. No. 9,015,225.

(51) Int. Cl.
*H04L 29/06* (2006.01)
*H04L 29/08* (2006.01)

(52) U.S. Cl.
CPC ........ *H04L 63/029* (2013.01); *H04L 67/1002* (2013.01); *H04L 67/142* (2013.01)

(58) Field of Classification Search
USPC .......................................................... 726/14
See application file for complete search history.

(56) References Cited

U.S. PATENT DOCUMENTS

| 3,416,043 A | 12/1968 | Jorgensen |
| 4,254,303 A | 3/1981  | Takizawa  |

(Continued)

FOREIGN PATENT DOCUMENTS

| CN | 1981496 A | 11/1927 |
| CN | 1464685   | 12/2003 |

(Continued)

OTHER PUBLICATIONS

USPTO "Non-Final Office Action" mailed Mar. 21, 2011; U.S. Appl. No. 12/426,103, filed Apr. 17, 2009.

(Continued)

*Primary Examiner* — Jason Lee
(74) *Attorney, Agent, or Firm* — LK Global

(57) ABSTRACT

Systems and methods are described for delivering messages from one or more service hosts to clients via a network. A first request identifying the client is received at the message server, and a connection is established and maintained between the message server and the client in response to the first request. When a subsequent request that identifies the client is received from the service host, a message is transmitted from the message server to the client over the previously-established connection. The methods and techniques may be used, for example, to provide messages from various services to placeshifting devices or other clients communicating via the network.

20 Claims, 3 Drawing Sheets

(56) References Cited

U.S. PATENT DOCUMENTS

Figure 1:
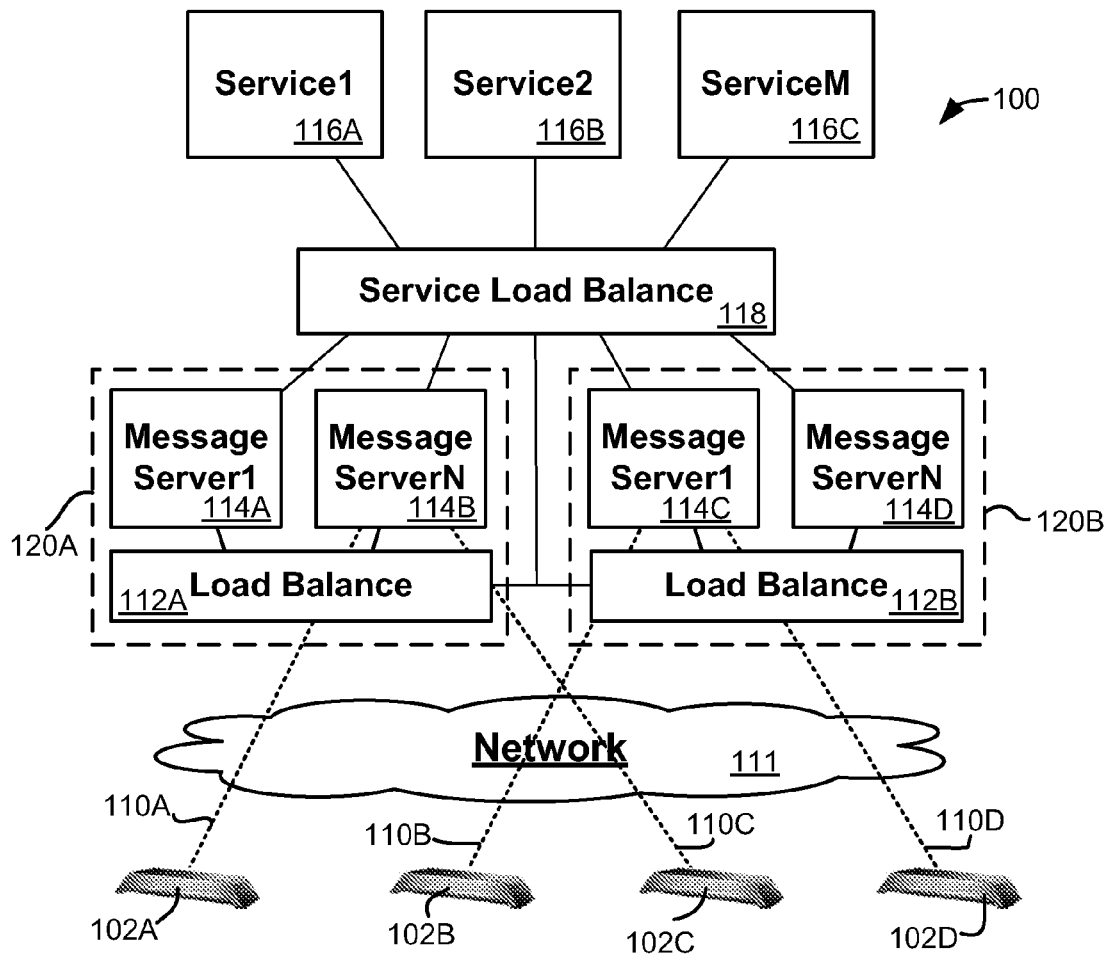

| | | |
|---|---|---|
| 5,161,021 A | 11/1992 | Tsai |
| 5,237,648 A | 8/1993 | Mills et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,421,429 B1 | 7/2002 | Merritt et al. |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,732,158 B1 | 5/2004 | Hesselink et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,127,507 B1 | 10/2006 | Clark et al. |
| 7,137,136 B1 | 11/2006 | Aratani |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,686 B1 | 9/2008 | Wang et al. |
| 7,464,396 B2 | 12/2008 | Hejna, Jr. |

(56) References Cited

U.S. PATENT DOCUMENTS

| | | |
|---|---|---|
| 7,478,164 B1 | 1/2009 | Lango et al. |
| 7,478,166 B2 | 1/2009 | Agnoli et al. |
| 7,502,733 B2 | 3/2009 | Andrsen et al. |
| 7,505,480 B1 | 3/2009 | Zhang et al. |
| 7,516,136 B2 | 4/2009 | Lee et al. |
| 7,549,160 B1 | 6/2009 | Podar et al. |
| 7,558,862 B1 | 7/2009 | Tyukasz et al. |
| 7,565,681 B2 | 7/2009 | Ngo et al. |
| 7,594,218 B1 | 9/2009 | Lozben |
| 7,647,430 B2 | 1/2010 | Ng et al. |
| 7,676,590 B2 | 3/2010 | Silverman |
| 7,706,358 B2 | 4/2010 | Kitada |
| 7,721,300 B2 | 5/2010 | Tipton et al. |
| 7,721,315 B2 | 5/2010 | Brown et al. |
| 7,895,275 B1 | 2/2011 | Evans et al. |
| 7,917,602 B2 | 3/2011 | Sweatt, III et al. |
| 7,921,150 B1 | 4/2011 | Schwartz |
| 7,945,688 B1 | 5/2011 | Lango et al. |
| 7,975,047 B2 | 7/2011 | Dongre |
| 8,009,121 B1 | 8/2011 | Stuart et al. |
| 8,082,545 B2 | 12/2011 | Prakash |
| 8,171,148 B2 | 5/2012 | Lucas et al. |
| 8,194,681 B2 | 6/2012 | Kaarela et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0042921 A1 | 4/2002 | Ellis |
| 2002/0046404 A1 | 4/2002 | Mizutani |
| 2002/0053053 A1 | 5/2002 | Nagai et al. |
| 2002/0080166 A1 | 6/2002 | Sweatt, III et al. |
| 2002/0080753 A1 | 6/2002 | Lee |
| 2002/0083153 A1 | 6/2002 | Sweatt, III et al. |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0141401 A1* | 10/2002 | Albert ............... H04L 12/4633 370/389 |
| 2002/0143972 A1 | 10/2002 | Christopoulos et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0001880 A1 | 1/2003 | Holtz et al. |
| 2003/0028873 A1 | 2/2003 | Lemmons |
| 2003/0065915 A1 | 4/2003 | Yu et al. |
| 2003/0074660 A1 | 4/2003 | McCormack et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0198243 A1 | 10/2003 | Yamada |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0177151 A1 | 9/2004 | Kryeziu |
| 2004/0194141 A1 | 9/2004 | Sanders |
| 2004/0205830 A1 | 10/2004 | Kaneko |
| 2004/0212640 A1 | 10/2004 | Mann et al. |
| 2004/0216173 A1 | 10/2004 | Horoszowski et al. |
| 2004/0221029 A1 | 11/2004 | Jenkins et al. |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0155077 A1 | 7/2005 | Lawrence et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0034259 A1 | 2/2006 | Matsuda |
| 2006/0050970 A1 | 3/2006 | Gunatilake |
| 2006/0051055 A1 | 3/2006 | Ohkawa |
| 2006/0064307 A1 | 3/2006 | Pakkala |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0146174 A1 | 7/2006 | Hagino |
| 2006/0171395 A1 | 8/2006 | Deshpande |
| 2006/0190616 A1 | 8/2006 | Mayerhofer et al. |
| 2006/0206526 A1 | 9/2006 | Sitomer |
| 2006/0230345 A1 | 10/2006 | Weng et al. |
| 2006/0280157 A1 | 12/2006 | Karaoguz et al. |
| 2006/0280177 A1 | 12/2006 | Gupta et al. |
| 2006/0294183 A1 | 12/2006 | Agnoli et al. |
| 2007/0003224 A1 | 1/2007 | Krikorian et al. |
| 2007/0005783 A1 | 1/2007 | Saint-Hillaire et al. |
| 2007/0019545 A1 | 1/2007 | Alt et al. |
| 2007/0022328 A1 | 1/2007 | Tarra et al. |
| 2007/0043792 A1 | 2/2007 | O'Brien |
| 2007/0055728 A1 | 3/2007 | Shea et al. |
| 2007/0067390 A1 | 3/2007 | Agnoli et al. |
| 2007/0073767 A1 | 3/2007 | Springer, Jr. et al. |
| 2007/0074115 A1 | 3/2007 | Patten et al. |
| 2007/0076604 A1 | 4/2007 | Litwack |
| 2007/0107019 A1 | 5/2007 | Romano et al. |
| 2007/0136778 A1 | 6/2007 | Birger et al. |
| 2007/0147263 A1 | 6/2007 | Liao et al. |
| 2007/0168543 A1 | 7/2007 | Krikorian et al. |
| 2007/0180485 A1 | 8/2007 | Dua |
| 2007/0183436 A1 | 8/2007 | Hunter |
| 2007/0192325 A1* | 8/2007 | Morris ............... H04L 67/24 |
| 2007/0198532 A1 | 8/2007 | Krikorian et al. |
| 2007/0217407 A1 | 9/2007 | Yuan et al. |
| 2007/0234213 A1 | 10/2007 | Krikorian et al. |
| 2007/0286596 A1 | 12/2007 | Lonn |
| 2007/0288550 A1 | 12/2007 | Ise et al. |
| 2008/0007651 A1 | 1/2008 | Bennett |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0060035 A1 | 3/2008 | Tsang et al. |
| 2008/0098472 A1 | 4/2008 | Enomoto et al. |
| 2008/0134267 A1 | 6/2008 | Moghe et al. |
| 2008/0195698 A1 | 8/2008 | Stefanovic et al. |
| 2008/0195744 A1 | 8/2008 | Bowra et al. |

(56) References Cited

U.S. PATENT DOCUMENTS

| | | | |
|---|---|---|---|
| 2008/0199150 | A1 | 8/2008 | Candelore |
| 2008/0209487 | A1 | 8/2008 | Oswann et al. |
| 2008/0215392 | A1 | 9/2008 | Rajan |
| 2008/0229404 | A1 | 9/2008 | Siegrist et al. |
| 2008/0294759 | A1 | 11/2008 | Biswas et al. |
| 2008/0301233 | A1 | 12/2008 | Choi |
| 2008/0307456 | A1 | 12/2008 | Beetcher et al. |
| 2008/0307462 | A1 | 12/2008 | Beetcher et al. |
| 2008/0307463 | A1 | 12/2008 | Beetcher et al. |
| 2009/0007198 | A1 | 1/2009 | Lavender et al. |
| 2009/0074380 | A1 | 3/2009 | Boston et al. |
| 2009/0133088 | A1 | 5/2009 | Kim et al. |
| 2009/0146779 | A1 | 6/2009 | Kumar et al. |
| 2009/0157777 | A1 | 6/2009 | Golwalkar et al. |
| 2009/0164600 | A1 | 6/2009 | Issa et al. |
| 2009/0199248 | A1 | 8/2009 | Ngo et al. |
| 2009/0254672 | A1 | 10/2009 | Zhang |
| 2009/0268740 | A1 | 10/2009 | Sindhu et al. |
| 2009/0282445 | A1* | 11/2009 | Yang .............. H04L 12/2818 725/93 |
| 2010/0005483 | A1 | 1/2010 | Rao |
| 2010/0023642 | A1 | 1/2010 | Ladd et al. |
| 2010/0030880 | A1 | 2/2010 | Joshi et al. |
| 2010/0034511 | A1 | 2/2010 | Kawai et al. |
| 2010/0046513 | A1 | 2/2010 | Park et al. |
| 2010/0061708 | A1 | 3/2010 | Barton |
| 2010/0070925 | A1 | 3/2010 | Einaudi et al. |
| 2010/0073202 | A1* | 3/2010 | Mazed ............... G06F 1/1613 340/999 |
| 2010/0077438 | A1 | 3/2010 | Ansari |
| 2010/0100898 | A1 | 4/2010 | Pfleging et al. |
| 2010/0100915 | A1 | 4/2010 | Krikorian et al. |
| 2010/0146527 | A1 | 6/2010 | Craib et al. |
| 2010/0169477 | A1 | 7/2010 | Stienhans et al. |
| 2010/0226444 | A1 | 9/2010 | Thevathasan et al. |
| 2010/0268832 | A1 | 10/2010 | Lucas et al. |
| 2010/0269144 | A1 | 10/2010 | Forsman et al. |
| 2010/0281042 | A1 | 11/2010 | Windes et al. |
| 2010/0309916 | A1 | 12/2010 | Oskouy et al. |
| 2010/0333162 | A1 | 12/2010 | Lloyd et al. |
| 2011/0002381 | A1 | 1/2011 | Yang et al. |
| 2011/0047079 | A1 | 2/2011 | Du et al. |
| 2011/0050908 | A1 | 3/2011 | Nam |
| 2011/0125861 | A1 | 5/2011 | Evans et al. |
| 2011/0307608 | A1 | 12/2011 | Chang et al. |
| 2011/0321079 | A1 | 12/2011 | Lankford |
| 2012/0039580 | A1 | 2/2012 | Sweatt, III et al. |
| 2012/0166669 | A1 | 6/2012 | Price |
| 2012/0219001 | A1 | 8/2012 | Sindhu et al. |

FOREIGN PATENT DOCUMENTS

| | | |
|---|---|---|
| CN | 1981496 A | 6/2007 |
| DE | 4407319 A1 | 9/1994 |
| EP | 0838945 A | 4/1998 |
| EP | 1077407 A1 | 2/2001 |
| EP | 1255395 A2 | 11/2002 |
| EP | 1443766 A2 | 8/2004 |
| EP | 1691550 A | 8/2006 |
| EP | 1830558 A1 | 9/2007 |
| EP | 2071839 A1 | 6/2009 |
| GB | 2307151 A | 5/1997 |
| JP | 2001211416 A | 8/2001 |
| JP | 2001345766 A | 12/2001 |
| JP | 2003304231 A | 10/2003 |
| JP | 2005229152 A | 8/2005 |
| JP | 200654535 A | 2/2006 |
| JP | 2006295909 A | 10/2006 |
| JP | 2007181123 A | 7/2007 |
| JP | 2008085470 A | 4/2008 |
| JP | 2008172621 A | 7/2008 |
| JP | 2009009582 A | 1/2009 |
| JP | 200907721 A | 4/2009 |
| JP | 2009118032 A | 5/2009 |
| KR | 19990082855 A | 11/1999 |
| KR | 20010211410 A | 8/2001 |
| TW | 545059 B | 8/2003 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 2003098897 A | 11/2003 |
| WO | 2004032511 A1 | 4/2004 |
| WO | 2005050898 A2 | 6/2005 |
| WO | 2006064454 A1 | 6/2006 |
| WO | 2006074110 A | 7/2006 |
| WO | 2007027891 A2 | 3/2007 |
| WO | 2007051156 A2 | 5/2007 |
| WO | 2007096001 A1 | 8/2007 |
| WO | 2007141555 A2 | 12/2007 |
| WO | 2007149466 A2 | 12/2007 |
| WO | 2008024723 A | 2/2008 |
| WO | 2009073828 A1 | 6/2009 |
| WO | 2009073830 A1 | 6/2009 |
| WO | 2009134073 A2 | 11/2009 |

OTHER PUBLICATIONS

European Patent Office, International Searching Authority, "International Search Report" mailed Mar. 18, 2011; International Appln. No. PCT/US2010/060797, filed Dec. 16, 2010.
USPTO "Non-Final Office Action" mailed Apr. 27, 2012; U.S. Appl. No. 12/821,983, filed Jun. 23, 2010.
USPTO "Non-Final Office Action" mailed Jun. 27, 2012 for U.S. Appl. No. 13/458,852, filed Apr. 27, 2012.
USPTO "Final Office Action" mailed Aug. 7, 2012 for U.S. Appl. No. 12/821,983, filed Jun. 23, 2010.
European Patent Office, International Searching Authority, "International Search Report," mailed Dec. 13, 2010; International Application No. PCT/US2010/029062 filed Mar. 29, 2010.
European Patent Office, International Searching Authority, "International Search Report" mailed Nov. 16, 2011; International Patent Appln. No. PCT/US2011/039937, filed Jun. 10, 2011.
Japan Patent Office, Notice of Rejection Grounds mailed Jan. 21, 2014 for Japanese Patent Application No. 2013-516600.
Hungarian Intellectual Property Office as Examiner According to the Memorandum of Understanding Between Intellectual Property Office of Singapore and the Hungarian Intellectual Property Office, Examination Report mailed Jan. 16, 2014 for Singapore Patent Application No. 201204603-3.
Krikorian, Jason, U.S. Appl. No. 11/734,277, filed Apr. 12, 2007.
Tarra, Raghuveer et al., U.S. Appl. No. 60/975,239, filed Sep. 26, 2007.
Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affi liate/tvbs/tvbrick/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html.].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.

(56) References Cited

OTHER PUBLICATIONS

Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
Bajpai, Parimal et al. "Systems and Methods of Controlling the Encoding of a Media Stream," U.S. Appl. No. 12/339,878, filed Dec. 19, 2008.
Malone, Edward D. et al. "Systems and Methods for Controlling Media Devices," U.S. Appl. No. 12/256,344, filed Oct. 22, 2008.
Banger, Shashidhar et al. "Systems and Methods for Determining Attributes of Media Items Accessed Via a Personal Media Broadcaster," U.S. Appl. No. 12/334,959, filed Dec. 15, 2008.
Kulkarni, Anant Madhava "Systems and Methods for Creating Logical Media Streams for Media Storage and Playback," U.S. Appl. No. 12/323,907, filed Nov. 26, 2008.
Rao, Padmanabha R. "Systems and Methods for Linking Media Content," U.S. Appl. No. 12/359,784, filed Jan. 26, 2009.
Krikorian, Blake Gary et al. "Systems and Methods for Presenting Media Content Obtained From Multiple Sources," U.S. Appl. No. 12/408,456, filed Mar. 20, 2009.
Krikorian, Blake Gary et al. "Systems and Methods for Projecting Images From a Computer System," U.S. Appl. No. 12/408.460, filed Mar. 20, 2009.
USPTO "Non-Final Office Action" mailed Sep. 14, 2012 for U.S. Appl. No. 12/635,138.
USPTO "Non-Final Office Action" mailed Oct. 12, 2012 for U.S. Appl. No. 12/645,870.
Intellectual Property Office of Singapore "Search Report and Written Opinion" dated Nov. 8, 2012 for Singapore Appl. No. 201107539-7.
USPTO "Non-Final Office Action" mailed Dec. 21, 2012 for U.S. Appl. No. 12/648,024.
USPTO "Non-Final Office Action" dated Feb. 25, 2013 for U.S. Appl. No. 13/458,852.
Japan Patent Office, Notice of Rejection Ground, dated Mar. 26, 2013 for Japanese Patent Application No. 2012-506055.
Australian Government, Patent Examination Report No. 1, dated Apr. 5, 2013 for Australian Patent Application No. 2010236888.
Intellectual Property Office, Office Action, dated Apr. 26, 2013 for Taiwan Patent Application No. 099111307.
Canadian Intellectual Property Office, Office Action, dated May 17, 2013 for Canadian Patent Application No. 2,758,791.
Intellectual Property Office, Office Action, dated May 20, 2013 for Taiwan Patent Application No. 099144605.
Intellectual Property Office of Singapore, Written Opinion, dated May 30, 2013 for Singapore Patent Application No. 201204603-3.
USPTO, Notice of Allowance, dated Jun. 24, 2013 for U.S. Appl. No. 12/635,138.
USPTO, Final Office Action, dated Aug. 1, 2013 for U.S. Appl. No. 12/645,870.
Intellectual Property Office of Singapore, Search and Examination Report, dated Aug. 30, 2013 for Singapore Patent Application No. 201107539-7.
USPTO "Non-Final Office Action" dated Oct. 17, 2013 for U.S. Appl. No. 12/648,024.
Japan Patent Office, Notice of Rejection Ground mailed Oct. 29, 2013 for Japanese Patent Application No. 2012-546061.
China State Intellectual Property Office, First Office Action, dated Nov. 8, 2013 for China Patent Application No. 201080016835.6.
Australian Government, Patent Examination Report No. 1, dated Nov. 15, 2013 for Australian Patent Application No. 2011271358.
USPTO "Final Office Action" dated Nov. 18, 2013 for U.S. Appl. No. 13/458,852.
Japan Patent Office, Notice of Rejection Grounds, dated Dec. 3, 2013 for Japanese Patent Application No. 2012-506055.
Intellectual Property Office, Office Action, dated Dec. 30, 2013 for Taiwan Patent Application No. 099144605.
European Patent Office, European Search Report for European Application No. EP 08 16 7880, mailed Mar. 4, 2009.
MythTV Wiki, "MythTV User Manual" [Online], Aug. 27, 2007, XP002515046; retrieved from the Internet: <URL: http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809.868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.

(56) References Cited

OTHER PUBLICATIONS

USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast : Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming Via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
Conway, Frank et al. "Systems and Methods for Creating Variable Length Clips from a Media Stream," U.S. Appl. No. 12/347,465, filed Dec. 31, 2008.
Lucas, Brian et al. "Systems and Methods for Establishing Connections Between Devices Communicating Over a Network," U.S. Appl. No. 12/426,103, filed Apr. 17, 2009.
USPTO, Final Office Action, mailed Nov. 6, 2009; U.S. Appl. No. 09/809,868, filed Mar. 15, 2001.
Thiyagarajan, Venkatesan et al. "Always-On-Top Media Player Launched From a Web Browser," U.S. Appl. No. 12/617,271, filed Nov. 12, 2009.
USPTO Final Office Action mailed Dec. 30, 2009; U.S. Appl. No. 11/147,664, filed Jun. 7, 2005.
USPTO, Final Office Action mailed Nov. 12, 2009; U.S. Appl. No. 11/620,707, filed Jan. 7, 2007.
USPTO, Non-Final Office Action mailed Nov. 23, 2009; U.S. Appl. No. 11/683,862, filed Mar. 8, 2007.
USPTO, Non-Final Office Action mailed Oct. 1, 2009; U.S. Appl. No. 11/778,287, filed Jul. 16, 2007.
European Patent Office, European Search Report, mailed Sep. 28, 2009 for European Application No. EP 06 78 6175.
PCT Partial International Search, PCT/US2009/054893, mailed Dec. 23, 2009.
International Search Report for PCT/US2008/069914 mailed Dec. 19, 2008.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
Newton's Telecom Dictionary, 21st ed., Mar. 2005.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplayty.com/, Aug. 15, 2000.
Srisuresh, P. et al. "Traditional IP Network Address Translator (Traditional NAT)," Network Working Group, The Internet Society, Jan. 2001.
Asnis, Ilya et al. "Mediated Network address Translation Traversal" U.S. Appl. No. 12/405,039, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Bajpal, Parimal et al. "Method and Node for Transmitting Data Over a Communication Network using Negative Ackhowledgement," U.S. Appl. No. 12/404,920, filed Mar. 16, 2009.
Paul, John et al. "Systems and Methods for Remotely Controlling Media Server Via a Network," U.S. Appl. No. 12/645,870, filed Dec. 23, 2009.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Canadian Intellectual Property Office, Official Action, mailed Jan. 23, 2014 for Canadian Patent Application No. 2,803,796.
U.S. Patent and Trademark Office, Notice of Allowance, mailed May 9, 2014 for U.S. Appl. No. 13/458,852.
Australian Government, Notice of Acceptance, dated May 29, 2014 for Australian Patent Application No. 2011271358.
International Search Report and Written Opinion for International Application No. PCT/US2006/025911, mailed Jan. 3, 2007.

(56) References Cited

OTHER PUBLICATIONS

International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
Japan Patent Office, "Decision of Rejection" mailed Jun. 3, 2014 for Japanese Patent Application No. 2012-506055.
Japan Patent Office, "Decision of Dismissal of Amendment" mailed Jun. 3, 2014 for Japanese Patent Application No. 2012-506055.
Korean Intellectual Property Office, "Notice of Allowance" mailed Jun. 9, 2014 for Korean Patent Application No. 10-2013-7001665.
USPTO, "Non-Final Office Action" mailed Jun. 19, 2014 for U.S. Appl. No. 12/821,983.
USPTO, Final Office Action, mailed Aug. 14, 2014 for U.S. Appl. No. 12/648,024.
European Patent Office, International Searching Authority, "International Search Report," mailed Mar. 30, 2010; International Application PCT/US2009/068468 filed Dec. 27, 2009.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
China State Intellectual Property Office "First Office Action," issued Jan. 8, 2010, for Application No. 200810126554.0.
USPTO Final Office action mailed Jan. 25, 2010; U.S. Appl. No. 11/734,277, filed Apr. 12, 2007.
Australian Government "Office Action," Australian Patent Application No. 2006240518, mailed Nov. 12, 2009.
Jain, Vikal Kumar "Systems and Methods for Coordinating Data Communication Between Two Device," U.S. Appl. No. 12/699,280, filed Feb. 3, 2010.
Gangotri, Arun L. et al. "Systems and Methods and Program Applications for Selectively Restructuring the Placeshiftnig of Copy Protected Digital Media Content," U.S. Appl. No. 12/623,955, filed Nov. 23, 2009.
Paul, John et al. "Systems and Methods for Searching Media Content," U.S. Appl. No. 121648,024, filed Dec. 28, 2009.
Newton's Telcom Dictionary, 20th ed., Mar. 2004.
"The Authoritative Dictionary of IEEE Standard Terms," 7th ed. 2000.
Gurzhi, Alexander et al. "Systems and Methods for Emulation Network-Enabled Media Components," U.S. Appl. No. 12/711,830, filed Feb. 24, 2010.
USPTO "Final Office Action" mailed Oct. 17, 2011; U.S. Appl. No. 12/426,103, filed Apr. 17, 2009.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
China State Intellectual Property Office "Office Action" issued Mar. 18, 2010 for Application No. 200680022520.6.
China State Intellectual Property Office "Office Action" issued Apr. 13, 2010 for Application No. 200580026825.X.
Canadian Intellectual Property Office "Office Action" mailed Feb. 18, 2010 for Application No. 2569610.
European Patent Office "European Search Report," mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
U.S. Patent and Trademark Office, Non-Final Office Action, mailed Mar. 27, 2014 for U.S. Appl. No. 12/645,870.
Canadian Intellectual Property Office, Notice of Allowance, dated Jun. 30, 2014 for Canadian Patent Application No. 2,758,791.
Australian Government, Notice of Acceptance, dated Jul. 16, 2014 for Australian Patent Application No. 2010236888.
USPTO "Notice of Allowance" mailed Jan. 10, 2012; U.S. Appl. No. 12/426,103, filed Apr. 17, 2009.
China State Intellectual Property Office, Office Action, dated Aug. 27, 2014 for China Patent Application No. 201080016835.6.
United States Patent and Trademark Office, Final Office Action, dated Dec. 17, 2014 for U.S. Appl. No. 12/645,870.
Fielding et al., Hypertext Transfer Protocol—Http/1.1, W3C/MIT, Jun. 1999.
State Intellectual Property Office of the People's Republic of China, Office Action for Chinese Patent Application No. 201180030790.2 mailed Feb. 27, 2015.

(56) References Cited

OTHER PUBLICATIONS

USPTO, Office Action for U.S. Appl. No. 12/648,024 mailed Mar. 12, 2015.
Canadian Intellectual Property Office, Office Action for Canadian Patent Application No. 2,803,796 mailed Feb. 26, 2015.
USPTO, Office Action for U.S. Appl. No. 14/486,908 mailed Mar. 27, 2015.
Israel Patent Office, Official Action for Israel Patent Application No. 215671 mailed Mar. 19, 2015.
The International Bureau of WIPO, International Preliminary Report on Patentability for International Application No. PCT/US2010/029062 mailed Oct. 18, 2011.
State Intellectual Property Office of the People's Republic of China, Office Action in Chinese Patent Application No. 201080016835.6 mailed Apr. 27, 2015.
Intellectual Property Office, Office Action for ROC (Taiwan) Patent Application No. 100122066 mailed Apr. 29, 2015.
Israel Patent Office, Official Action for Israel Patent Application No. 220481 mailed May 31, 2015.
The International Bureau of WIPO, International Preliminary Report on Patentability for International Application No. PCT/US2010/060797 mailed Jun. 26, 2012.
Canadian Intellectual Property Office, Official Action for Canadian Patent Application No. 2,784,956 mailed Apr. 30, 2015.
Intellectual Property Office, Office Action in ROC (Taiwan) Patent Application No. 099144605 mailed May 20, 2015.
USPTO, Notice of Allowance and Fee(s) Due for U.S. Appl. No. 12/821,983 mailed Mar. 23, 2015.
USPTO, Notice of Allowance and Fee(s) Due for U.S. Appl. No. 12/645,870 mailed Jul. 7, 2015.
Japan Patent Office, Notice of Rejection Ground for Japanese Patent Application No. 2012-506055 mailed Jul. 14, 2015.
Japan Patent Office, Decision to Grant for Japanese Patent Application No. 2013-516600 mailed Nov. 25, 2014.
USPTO, Notice of Allowance and Fee(s) Due for U.S. Appl. No. 12/619,192 mailed Dec. 5, 2014.
USPTO, Final Office Action for U.S. Appl. No. 12/821,983 mailed Dec. 15, 2014.
USPTO, Final Office Action for U.S. Appl. No. 13/098,198 mailed Dec. 18, 2014.
Fielding et al. Hypertext Transfer Protocol—HTTP/1.1 RFC 2616—Section 8 Connections. available Jan. 27, 2001. retrieved from <http://www.w3.org/Protocols/rfc2616/rfc2616-sec8.htmi> via Internet Archive on <May 25, 2014>>.
IP Australia, Notice of Acceptance for Australian Patent Application No. 2010333843 mailed Jul. 2, 2015.
State Intellectual Property Office of the People's Republic of China, Reexamination Notification in Chinese Patent Application No. 201080016835.6 mailed Dec. 30, 2016.

\* cited by examiner

SYSTEMS AND METHODS FOR DELIVERING MESSAGES OVER A NETWORK

PRIORITY CLAIM

This application claims priority to U.S. patent application Ser. No. 12/619,192 which was filed on Nov. 16, 2009 and is incorporated herein by reference.

TECHNICAL FIELD

The present disclosure generally relates to systems and methods for delivering messages between devices communicating over a network. Such systems and techniques may be useful, for example, in providing messages from network-based services to set-top boxes, digital video recorders (DVRs), video game players, placeshifting devices and/or other clients.

BACKGROUND

The Internet and other digital communications networks continue to have significant effects on every aspect of personal and professional life. Network communications are becoming increasingly ubiquitous due to the reduced cost and increased capability of portable computing devices, as well as the increasing prevalence and capability of mobile telephony and other wireless communications technologies. Additionally, more and more devices, including set top boxes, television receivers, video game players, placeshifting devices, media players and the like, are becoming enabled for network communications.

While modern technologies allow increased mobility and improved access to data and services, a tradeoff often exists between network access and security. Although many homes and businesses have access to broadband network connectivity, for example, most of these network connections are protected by a firewall or the like to prevent unwanted intrusions. Firewalls and other structures, while effectively preserving the security of a home or other network, can have the undesired effect of preventing access to desired services or other features that are located on the opposite side of the firewall. For example, if a network service wishes to provide programming, data or instructions to a client that is located behind a firewall, such communications are often blocked to prevent security breaches. Configuring the firewall to allow access from the network service may be difficult for many users, and may also create undesirable security gaps that could be exploited by others. If a customer service representative, for example, needs to gain access to a device located behind a firewall to assist the user in configuring or using the device, such a connection may be very difficult to establish using conventional techniques.

In addition to preventing unwanted access to a secure network, then, firewalls and other security mechanisms may prevent legitimate and desired access to remotely-located content or services, particularly if the security mechanism is incorrectly or incompletely configured by the user. Challenges can therefore arise in effectively establishing connections between clients and services for media streaming, media recording, placeshifting, gaming and/or other applications.

As a result, it is now desirable to create systems and methods for reliably and conveniently transmitting messages from services to clients over a network. These and other desirable features and characteristics will become apparent from the subsequent detailed description and the appended claims, taken in conjunction with the accompanying drawings and this background section.

BRIEF SUMMARY

According to various exemplary embodiments, systems and methods are described for providing messages to devices communicating via a network. Certain methods and techniques described below may be used in some instances to provide messages to placeshifting devices, set top boxes, digital video recorders, video game players, media players, computing systems and/or other client systems. Such messages may be used, for example, to establish real-time or near real-time communications between the service and the client device as desired. While much of the following discussion uses placeshifting as an illustrative example, other embodiments may be equivalently applied in other applications and settings, including any settings relating to media streaming, media recording, game playing and/or the like.

Various embodiments provide a method to allow a first server to contact a client over a network using a message server. This method comprises receiving a first request identifying the client at the message server, establishing a connection between the message server and the client in response to the first request, receiving a second request from the first server at the message server, wherein the second request identifies the client, and, in response to the second request, transmitting a message from the message server to the client over the connection.

In other embodiments, a system to process messages from at least one service host to a plurality of clients is provided. The system comprises a plurality of message servers and a load balancer. The load balancer is configured to receive the connection requests from each of the plurality of clients and to assign each of the connection requests to one of the plurality of message servers. Each message server is configured to establish and maintain persistent connections with at least some of the plurality of clients in response to connection requests, and to transmit messages received from the at least one service host to the at least some of the plurality of clients over the persistent connections.

Still other embodiments provide a method to allow a first server to contact a client over a network. In this exemplary embodiment, a method comprises receiving a first request identifying the client, assigning the first request to an assigned one of a plurality of message servers, maintaining a persistent connection between the assigned one of the plurality of message servers and the client, receiving a second request from the first server, wherein the second request identifies the client, and, in response to the second request, transmitting a message from the assigned one of the plurality of message servers to the client over the persistent connection, wherein the message comprises information that allows the client to contact the first server and thereby establish the interaction between the service and the client.

Various other embodiments, aspects and features are described in more detail below.

BRIEF DESCRIPTION OF THE DRAWING FIGURES

Figure 2:
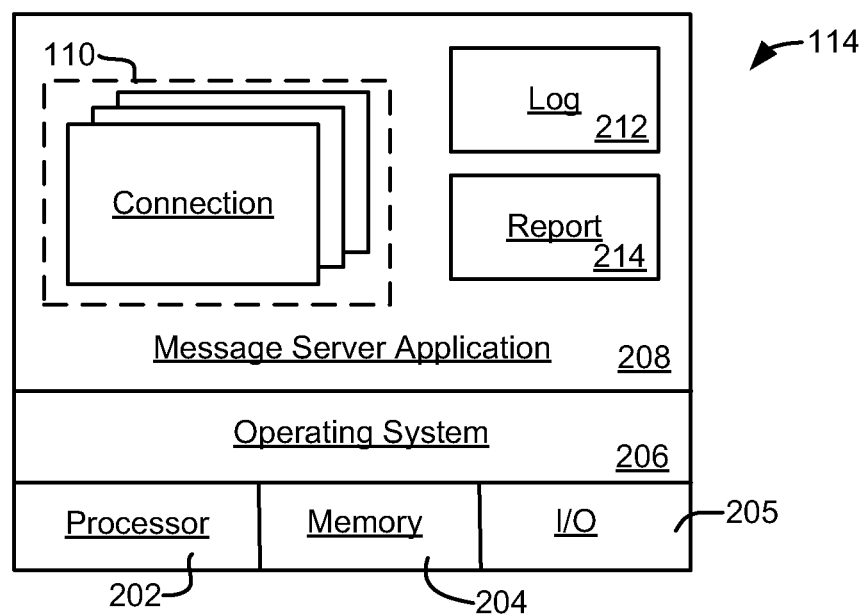

Exemplary embodiments will hereinafter be described in conjunction with the following drawing figures, wherein like numerals denote like elements, and FIG. 1 is a block diagram of an exemplary messaging system;

FIG. 2. is a block diagram of an exemplary message server; and

Figure 3:
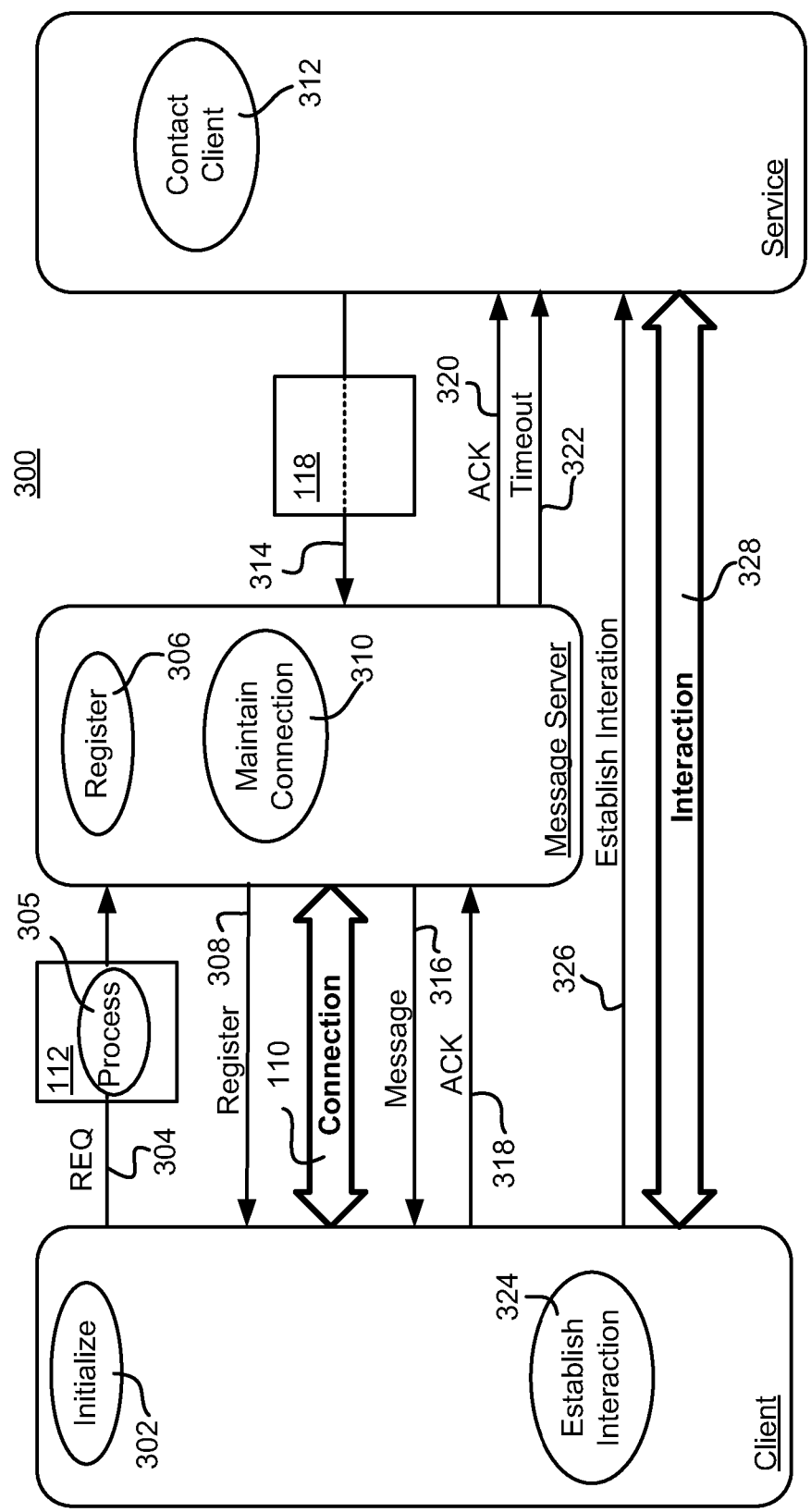

FIG. 3 is a diagram showing various exemplary techniques for processing messages between a client and a service.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, client devices are configured to initially contact a message server that is located on a digital network. The message server establishes a persistent connection with the client device that can be maintained over time. When a service later wishes to contact a particular client, the service notifies the message server, which suitably sends a message to the client over the persistent connection that identifies the service or that otherwise allows the client device to contact the requesting service for further communications. Using the information contained in the message, the client can establish a direct or other connection with the requesting service, thereby allowing real-time (or near real-time) interaction between clients and servers. This basic structure may be used in any number of settings, including placeshifting, media streaming, game playing, and/or any other application as desired.

Unlike techniques that rely upon intermittent polling by the client to obtain information from network-based services, various embodiments of the network server may be able to provide improved flexibility in contacting any number of different network services. Moreover, the use of a pre-existing connection allows particular devices to be contacted by one or more network services as information becomes available (e.g., in real-time or pseudo-real-time) rather than waiting for polling from the device. That is, messages can be "pushed" in real-time (or near real time) from the network server rather than waiting for the client to "pull" the information from the server. This relative immediacy provides a greatly improved user experience.

Although the discussion herein often refers to placeshifting devices and techniques for convenience of illustration, equivalent embodiments could apply the same structures and methods described herein in any number of other settings. To that end, the techniques described herein could be readily used to establish communications with or between any sorts of clients and/or services over any sort of network. Examples of such applications may include any types of media streaming applications, any types of media sharing or storage applications, video recording, video or computer gaming, and/or any other application(s) as desired. Indeed, the messaging techniques used herein could be equivalently applied to any number of client devices, such as set top boxes (STBs) or other television content receivers, digital video recorders (DVRs), video game players, computer systems and/or the like. Such devices may be contacted in real-time or on any other basis to provide programming instructions, data and/or other information as desired.

Turning now to the drawing figures and with initial reference to FIG. 1, an exemplary messaging system 100 for transmitting messages from any number of network servers 116A-C to any number of clients 102A-D suitably includes any number of message servers 114A-D, load balancers 112A-B, and a service load balancer 118. Each client device 102A-D maintains a connection 110A-D (respectively) with at least one message server 114 over a network 111. These connections 110 are appropriately initiated by the client device 102 and maintained by message server 114 so that the connections are already in place when one or more services 116A-C attempt to contact the client device 102. Connections may be initially assigned by any number of load balancers 112A-B, as appropriate. In the example of FIG. 1, message servers 114A-D are arranged into two clusters 120A-B of servers 114, with each cluster having its own load balancer 112A-B (respectively). Other embodiments may be logically and/or physically arranged in any other manner.

When a service 116 does intend to contact a particular client 102, the service 116 contacts the message server 114 that is maintaining the connection no to the desired client 102. Service 116 may forward messages to the appropriate message server 114 using one or more service load balancers 118 or the like. Upon receiving an instruction from a service 116, the appropriate message server 114 then sends a message to the client device 102 over the pre-existing and persistent connection no. The receiving device 102 is then able to process the message as desired. In various embodiments, the receiving client 102 contacts the requesting service 116 to establish a communications session, to receive further instructions, or for any other purpose.

Client 102 may be any device, component, module, hardware, software application and/or the like that is capable of communicating over network 111. To that end, many different types of clients 102 may be implemented with any sort of general or special purpose hardware, software and/or firmware. In some embodiments, clients 102 may include standalone devices having network connectivity, such as any sort of placeshifting device, video game player, STB or other television programming receiver, digital video recorder, and/or the like. Other embodiments of clients 102 may include conventional personal computers, workstations and/or other systems. In still other embodiments, some types of clients 102 may include software client applications, applets or other processes executing on any sort of general or special purpose computing hardware.

Although the concepts described herein could be used in many different applications other than placeshifting, several examples of clients 102 suitable for use in placeshifting applications may be implemented using any of the various SLINGBOX products available from Sling Media of Foster City, Calif. and/or any number of other suppliers. Many different types of placeshifting devices are generally capable of receiving media content from an external source, such as any sort of digital video recorder (DVR), set top box (STB), cable or satellite programming source, video disk player, and/or the like. In other embodiments, client 102 may be integrated with any sort of content-receiving or other capabilities. Some embodiments of client 102 may provide a hybrid STB or other receiver, for example, that also provides transcoding and placeshifting features. Such a device may receive satellite, cable, broadcast and/or other signals that encode television programming or other content received from an antenna, modem, server and/or other source. The receiver may further demodulate or otherwise decode the received signals to extract programming that can be locally viewed and/or place shifted to a remote media player as appropriate. Such devices may also include a content database stored on a hard disk drive, memory, or other storage medium to support a personal or digital video recorder (DVR) feature or other content library as appropriate.

Hence, in some embodiments, a media receiver or other source of content may be physically and/or logically contained within a common component, housing or chassis with client 102. Examples of conventional placeshifting functions, features, systems and structures are described in United States Patent Publication No. 2006/0095471, al though the features described herein could be equivalently applied with any number of other techniques and structures in addition to those described in that particular publication.

Some implementations of client 102 may be software programs, applets or the like executing on a conventional computing system (e.g., a personal computer). In such embodiments, client 102 may encode, for example, some or all of a screen display typically provided to a user of the computing system for placeshifting to a remote location. One device capable of providing such functionality is the SlingProjector product available from Sling Media of Foster City, Calif., which executes on a conventional personal computer, al though other products could be used as well. And again, the types of clients 102 used in system 100 are not limited to placeshifting devices; any other clients 102 that are capable of communicating on network 111 could be equivalently applied. Other types of client applications may include media players, personal video recorders (PVRs), video games, and/or any other types of clients as desired.

Network 111 is any digital or other communications network capable of transmitting messages between senders (e.g., client 102) and receivers (e.g., client 102). In various embodiments, network 111 includes any number of public or private data connections, links or networks supporting any number of communications protocols. Network 111 may include the Internet, for example, or any other network based upon TCP/IP or other conventional protocols, including any protocols or standards that are presently known or subsequently developed. In various embodiments, network 111 may also incorporate a wireless and/or wired telephone network, such as a cellular communications network for communicating with mobile phones, personal digital assistants, and/or the like. Various embodiments of network 111 may also incorporate any sort of wireless or wired local area networks, such as one or more IEEE 802.3 and/or IEEE 802.11 networks.

As noted above, directly connecting to a client 102 from a network service 116 may not always be convenient due to the presence of one or more firewalls or other security mechanisms within network 111, or any number of other factors. Various embodiments therefore provide any number of message servers 114A-D that are each capable of maintaining separate connections no with one or more clients 102A-D. Each message server 114A-D is implemented using conventional computer server hardware, software and/or services, as described more fully below in conjunction with FIG. 2. Each message server 114A-D suitably receives requests for connections 110A-D from one or more clients 102A-D. Such messages may be relayed in some embodiments from load balancing 112, as appropriate.

Each connection 110A-D may be initiated by the client 102A-D to facilitate convenient access, since many network security mechanisms will permit outgoing requests from client 102A-D more readily than incoming requests from server 116. Hence, each client 102A-D can be configured (e.g., through software or firmware) to establish a connection 110 with a message server 114A-D, as described herein. Clients 102 may establish such connections at startup, and/or at any other convenient time.

In various embodiments, each connection 110A-D is a persistent connection that can be readily maintained over time even when active communications with the client 110A-D are not needed. Connections 110 may be established using any protocols or techniques. Transmission control protocol (TCP) connections, for example, could be readily established and maintained over time in some embodiments since many firewalls will permit outgoing TCP connections from clients 102 located on a trusted network. Moreover, the TCP "keepalive" feature can be used to maintain an active connection 110 to the client 102 without substantial network overhead when the connection 110 is not in active use. Once a TCP connection 110 is established, for example, the connection no may be maintained over time by simply transmitting relatively low-overhead "keepalive" messages using the connection 110 to prevent the connection 110 from timing out. Examples of conventional TCP features are described in Internet RFC 1122, although many embodiments will use TCP, TCP-like and/or other features that may vary from the features described in this particular document.

By pre-establishing the connection 110 from the client 102 to the messaging server 114, a persistent channel is maintained over time even though the server is behind a firewall or other security feature. The pre-existing connection no can be used to transmit subsequent instructions and/or other messages to client 102 on behalf of one or more networked services 116A-C, as described more fully below.

In the example of FIG. 1, two separate clusters 120A-B of message servers 114 are shown, with each cluster 120 including any number of message servers 114 and associated load balancers 112. Clusters may be assigned to represent different types of clients 102, different geographic areas, different logical portions of a network (e.g., different portions of a network address space), and/or on any other basis. Other embodiments may eliminate clusters altogether and instead provide a single logical group of message servers 114, or even a single message server 114. The numbers of message servers 114A-D and the grouping of message servers 114 into clusters 120 will depend upon the particular needs of the services that are supported, the number of clients 102 that are supported, the processing capabilities of each message server 114, and/or any number of other factors.

In various embodiments, load balancers 112A-B may be provided to allocate message servers 114 and/or other resources efficiently and effectively. Load balancing 118 may be implemented using any combination of hardware and/or software resources or services, and may be based upon network traffic, processing loads on servers 120, geographic distribution of clients 102 and/or message servers 114, capabilities of clients 102 and/or any other factors as appropriate. In an exemplary embodiment, load balancers 112A-B receive loading information about each server 114 operating within the cluster 120. Loading information may be provided periodically (or on any other temporal basis) from each message server 114; in other embodiments, loading data may be additionally or alternately provided in response to requests from the load balancer 112 as desired.

As noted above, load balancing may be assigned to separate clusters 120A-B on any basis. In an example of such embodiments, clients 102 suitably contact an appropriate load balancer 112 (e.g., a load balancer 112 residing at a well-known or readily-obtainable URL or other network address) for the client location, type, or other parameters. The load balancer 112 associated with the proper cluster 120 would then assign the client request to an appropriate message server 114 operating within the cluster 120 based upon processing loads and/or other appropriate factors.

In other embodiments, some or all of the load balancing functionality may be shared between multiple clusters 120A-B as desired. Clients 102 may be configured, for example, to contact a common load balancer 112 at a well-known address or other network location. The common load balancer 112 may then allocate client connections between clusters 120A-B, message servers 114A-D or other resources on any basis. For example, clients of a particular type (e.g., a dedicated placeshifting device) may be directed toward a first cluster 120A, whereas clients of another type (e.g., a hybrid STB/placeshifting device) may be directed toward a different cluster 120B. The client type may be determined, for example, from a client identifier provided with the request message; the identifier value itself and/or the format of the identifier could indicate the type of client 102 that is sending the request. Differentiating clients 102 by type could allow message servers 114 operating within each cluster to be configured to support particular features that are appropriate for clients 102 of the assigned type. That is, certain types of clients 102 may not process certain types of messages that are available to other types of clients 102. In another example, clients 102 connecting from a particular geographic region may be directed toward a first cluster 120A that is located in (or otherwise associated with) that region, whereas clients 102 in a different geographic region may be directed toward a second cluster 120B in a different location. The geographic location of a client 102 may be determined from a network address (e.g., an internet protocol (IP) or other network address), or from any other physical or logical location information. Other embodiments may provide multiple levels of load balancing or routing; a first load balancer or router could determine a cluster 120 that is most appropriate for a requested connection, for example. The first load balancer could then forward the request to a second load balancer (e.g., load balancers 112A-B) associated with the appropriate cluster 120A-B for assignment to a particular message server 114A-D. Any number of additional clusters 120, load balancers 112 and/or message servers 114 may be provided and organized in any desired manner.

System 100 may support any number of network services 116A-C as desired. Each network service 116 is implemented using conventional network server hardware, software, services and/or other features as desired. The particular feature(s) provided by each network service 116 will vary from embodiment to embodiment. In an exemplary embodiment that supports placeshifting clients 102, for example, various network services 116 may support the establishment of relay connections between clients 102 and media players over network 111, online programming of DVR or other functions of clients 102 from remote locations, online viewing of content placeshifted from clients 102, customer service features, and/or any number of other features as desired. Other settings and applications may provide other network services 116, such as any services supporting online gaming, playing of media content, and/or the like.

In the embodiment shown in FIG. 1, each network service 116A-C identifies a message server 114A-D that maintains a connection 110A-D with a desired client 102A-D through service load balancer 118. In various embodiments, service load balancer 118 is able to identify message servers 114 associated with a particular client 102 by applying a hash or similar algorithmic method to a client identifier associated with the desired client 102. The results of this method could then be readily correlated to a particular server 114. In other embodiments, service load balancer 118 maintains a database or other listing that correlates clients 102 to particular message servers 114A-D. In various embodiments, service load balancer 118 may be physically and/or logically combined with load balancers 112A-B to provide a common load balancing system 112/118 that routes messages and facilitates communications between clients 102, services 116 and/or message servers 114 as desired. In other embodiments, service load balancer 118 is implemented in separate hardware or other logic from load balancers 112A-B.

To provide a message to a particular client 102 that has previously established a connection 110 to a particular message server 114, then, the network service 116 suitably provides a message the message server 114 that is maintaining the desired connection 110. The message may be routed to the appropriate server 114 from the service load balancer 118; that is, the network service 116 suitably provides a message to the load balancer 118, which performs a hash or other process on a client identifier or other data contained within the message to identify the particular message server 114 that is holding the connection no to the particular client 102. The message is then provided to the appropriate message server 114 to direct the message server 114 to contact the particular client 102 as desired. The message server 114 then transmits an appropriate message to the client 102 over the pre-existing connection 110. The particular message may contain a payload or other data provided by the network service 116 in some embodiments; other messages may simply contain information that directs the client 102 to contact network service 116 (or another host) for further action.

Upon receiving a message over connection 110, the receiving client 102 can process the received message in any manner. In some embodiments, the message may direct the client 102 to establish a second connection (e.g., a second outgoing TCP connection) to the requesting service 116 or another appropriate host. By pre-establishing a connection no with the client 102, then, various implementations may allow multiple services 116A-C to share the connection no with each client 102, thereby allowing a variety of messages to be transmitted to each client 102 from any number of different services 116. Moreover, messages sent from servers 116A-C can be provided to the client 102 on a relatively immediate basis in some embodiments. That is, if a server 116 wishes to contact a particular client 102, the server 116 need not wait until the client 102 polls the server 116, but rather can provide a message over connection 110 in real-time, or near real-time. "Real time" in this context refers to a communication that occurs in response to a stimulus (e.g., an initiating event such as a network request or a user input) without substantial delay between the stimulus and the communication. "Real time" communications, while typically occurring on a generally immediate basis, may nevertheless account for network and processing delays and other delays that are inherent in practical data communications systems.

FIG. 2 shows one example of a message server 114 that could be used to maintain any number of persistent connections 110 with any number of clients 102. As noted above, each cluster 120 or system 100 will typically include one or more message servers 114 organized in any physical and logical manner. To that end, each message server 114 within system 100 may be implemented with a server computer system or service that is based upon any processor, architecture and/or operating system. Each message server 114 will typically by implemented using any sort of conventional processing hardware 202, memory 204 and input/output features 205. Various embodiments may be implemented using dedicated or shared hardware servers; other implementations may make use of virtual server features as part of a "cloud computing" service, such as any of the cloud computing services provided by AMAZON, GOOGLE, MICROSOFT, IBM, UBUNTU, SUN MICROSYSTEMS and/or any number of other providers. In such embodiments, load balancers 112 and 118 and/or one or more network services 116 may also be implemented using cloud computing services as desired.

In various embodiments, each message server 114 is an actual or virtual computer system executing an operating system 206 such as any version of LINUX, UNIX, SOLARIS, NETWARE, WINDOWS, OS/X, AIX and/or the like. The various UNIX/LINUX operating systems typically provide a computing core that is capable of executing a message server application 208, as well as any number of daemons, processes, applications or other instance modules as desired. For example, a message server application 208 could execute as a daemon on message server 114, with each client connection 114 being managed as a separate process or instance that communicates with message server application 208 using features provided by operating system 208.

Message server application 208 is typically initiated when message server 114 is booted or otherwise initialized. In various embodiments, application 208 suitably registers with any appropriate load balancers 112 and/or 118 so that connections 110 can be appropriately distributed to message server 114. Application 208 then processes connection requests from clients 102 and/or network services 116 as appropriate. In the embodiment shown in FIG. 2, application 208 establishes connections 110 to clients 102, and maintains each of these connections 110 as active processes or instances. Application 208 may also provide any sort of connection log 212 or status information 214, as appropriate. In various embodiments, a daemon or other process can communicate using pre-established port numbers to facilitate convenient processing of received messages. For example, a "client" port (e.g., port 3490) could be monitored for messages received from clients 102, whereas a different "services" port (e.g., port 3400) could be monitored for messages received from services 116. Several examples of processes and tasks that may be provided by exemplary embodiments of application 208 are described below.

As connection requests are received from load balancer 112, various implementations of application 208 will register the client connection 110 with message server 114 as appropriate. Registration may involve responding to the TCP or other request made by the requesting client 102 to establish the connection, updating a table, database or other log 212 of connections maintained by application 208, and/or notifying load balancer 112 when the connection 110 is successfully established. Additional detail about establishing connections 110 is presented below in conjunction with FIG. 3.

As noted above, the established connections 110 may be used to send messages to clients 102 as requested by one or more network services 116. Messages may be sent to clients 102 via connections 110 in any manner. Some types of messages may simply provide a service identifier or other code to the client 102 that can be interpreted by the client 102 to provoke an appropriate reaction. A service identifier could simply provide a number of a requesting network service 116, for example, with a first value (e.g., "0001") identifying a first service 116A, a second value (e.g., "0002") identifying a second network service 116B, and so forth. When the client 102 receives a message containing the particular code, firmware or other logic within the client 102 can parse the code to contact the appropriate network service 116, or to take any other appropriate action. Certain codes could also be used to provide other responses by client 102. A simple "ping" service, for example, could be associated with a particular code (e.g., "0000") to provoke the client to simply transmit a short response to the message server 114. Other codes could be used for status requests or to provide other instructions to client 102, as desired.

In some embodiments, messages with payload data may be used in place of or in combination with coded messages as described above. In various embodiments, the message may include a data field that indicates the length of the payload (e.g., in bytes). The payload provided may be of any fixed or variable length, and may be formatted in any manner as desired.

Some embodiments may provide the ability to reset connections in response to messages sent by the load balancer 112 and/or another controlling entity. Such messages can direct the message server 114 to terminate a connection 110 to a particular client 102, and to remove the connection from the connection log 212 as appropriate. This may be beneficial if a message server 114 were to fail, or if the connection no were to somehow enter an unknown state. If multiple connections to a single client 102 were inadvertently established, for example, one or more of the connections could be terminated to avoid redundancy and/or to provoke the client 102 to re-establish a new, more reliable connection. In the meantime, message server 114 may transmit any messages that are intended for client 102 on each of the parallel connections until an active connection is identified. Further, load balancer 112 may instruct one or more message servers 114 to close or otherwise reset a connection 110 if the client 102 is also connected to another server 114. In some embodiments, clients 102 may be configured through firmware or the like to automatically contact load balancer 112 to obtain a new connection 110 when the active connection is reset or otherwise terminated.

Message server application 208 may also be configured to provide any status or reporting information 214 as requested. In various embodiments, application 208 is able to provide reporting information 214 in response to requests from load balancers 112 and/or 118, or any other controlling entity as desired. Information provided in response to various queries may include system status (e.g., connections maintained, processor load, memory or storage utilization, and/or the like), lists of client connections 110 (e.g., some or all of the information contained in log 212) and/or other information as desired.

Message server application 208 may provide any alternate and/or additional functions and features as desired. Generally, message server application 208 is implemented using conventional compiled object code derived from source code in any programming language (e.g., C, C++ or the like). Other embodiments may make use of an interpreted or other abstracted environment, such as the JAVA environment available from Sun Microsystems of Sunnyvale, Calif. or the .NET environment available from Microsoft Corporation of Redmond, Wash. Other embodiments may implement the various components of message server 114 using any other programming languages, scripting languages, development or execution environments, and/or the like. Such programming may be stored in source or object code form on any digital storage medium (e.g. memory 204, mass storage, removable media, or any other medium) that is accessible to message system 114.

Turning now to FIG. 3, an exemplary process 300 for establishing a connection 110 between a message server 114 and a client 102 over network 111 is shown. This connection no may be further used as shown to establish an interaction 328 between client 102 and network server 116 as desired.

Typically, client 102 initially contacts a message server 114 at startup or any other initializing state (function 302). As noted above, client 102 may initialize a connection with a message server 114 at startup, in response to a prior connection being dropped or reset, in response to a hard or soft re-boot of the client 102, and/or at any other appropriate time. This initialization may be driven by software or firmware executing within client 102; hence, changes to the initialization or connection processes may be implemented by updating software or firmware in client 102 in many embodiments.

Client 102 initially transmits a registration request 304 to message server 114 in any manner. In the example shown in FIG. 3, client 102 transmits the request 304 to a load balancer 112 that is available at a well-known or readily-determinable uniform resource locator (URL), internet protocol (IP) or other address. Request 304 may be sent using any format or protocol; in various embodiments, request 304 is a TCP message to facilitate convenient passage through network 111, including any firewalls or other security mechanisms that might prevent connections using other protocols. In such embodiments, request message 304 is sent within conventional TCP/IP frames that include sender addresses (e.g., IP addresses) and other information as appropriate. The body of request 304 may also include a client identifier that uniquely identifies the client 102 placing the request in some implementations.

Load balancer 112 receives and processes registration requests 304 from any number of clients 102 in any appropriate manner (function 305). In various embodiments, load balancer 112 suitably determines an appropriate message server 114 for maintaining the connection 110 with client 102. This determination may be based upon the client's geographic or logical location (as determined, for example, from an IP or other network address associated with client 102), the client type (as determined, for example, from a client identifier contained within request 304), current loading of servers 114 within a cluster 120, and/or any other factors as desired. Clients 102 may also be assigned based upon algorithmic processing (e.g., hashing) of a client identifier or the like that is contained within request 304. As noted above, multiple levels of load balancing may be provided to facilitate initial assignment to a cluster 120 of message servers 114 based upon client type and/or location, with subsequent assignment to a particular message server 114 based upon loading distribution within the assigned cluster 120. Any additional routing or load balancing may be provided as desired.

Load balancer 112 therefore assigns connections to various message servers 114 according to information about the requesting client 102, loading of the various message servers 114, and/or any other relevant information. Load balancer 112 suitably forwards the information in registration request 304 (including information about the requesting client 102) to the assigned message server 114 for subsequent processing. In various embodiments, load balancer 112 simply forwards the registration request 304 to the assigned message server 114 so that the assigned server 114 can respond to the TCP request 304 posited by the client 102. In equivalent embodiments, load balancer 112 may not provide the actual message to message server 114, but instead provides sufficient information (e.g., client identifiers, network address, etc.) to allow the message server 114 to appropriately respond to the request 304 and establish the persistent connection no.

Upon receiving an assigned connection request from the load balancer 112, message server 114 appropriately processes the request (function 306) to register the assigned client 102. As noted above, registration function 306 may involve adding the client identifier to a connection log 212, as appropriate, and responding to the client's request 304 with a registration acknowledgement 308. The registration acknowledgement 308 may be in TCP format in response to a TCP request 304 posited by the client.

After the request 304 and response 308 from the message server, a persistent connection 110 can be established for subsequent communications. As noted above, message server 114 and/or load balancer 112 will maintain the connection over time (function 310) by transmitting "keepalive" packets or the like to prevent the connection 110 from timing out or otherwise terminating. Such packets provide a relatively convenient mechanism for maintaining the reliable connection no without significant latency or overhead. Other embodiments may maintain the connection no in any other manner. Although not shown in FIG. 3, equivalent embodiments may provide a confirmation acknowledgement from message server 114 to load balancer 112 after the connection 110 is successfully established. Still other embodiments may provide a negative acknowledgement ("NAK") when the connection no is not successfully created.

After the connection 110 is established, subsequent messages may be provided to client 102 via message server 114. As a network service 116 desires to contact a particular client 102 (function 312), the service 116 provides an appropriate message 314 to the message server 114 that is maintaining the connection no with the client 102 of interest. To that end, network service 116 may provide the message 314 to service load balancer 118, as shown in FIG. 3. In equivalent embodiments, network service 116 simply posits a query to the service load balancer 118 to determine the particular message server 114 maintaining the connection 110 of interest. In such embodiments, messages 314 may be transmitted directly from network service 116 to message server 114, as appropriate. Message 314 will typically include an identifier associated with the client 102 and/or connection no so that the message server 114 is able to determine the particular client 102 that will receive the message 314 using algorithmic or other techniques.

When a message server 114 receives a message 314 from a network service 116, the message server is able to relay the message 316 to the client 102 via the pre-established connection 110. As briefly noted above, the message 316 may simply include a service identifier or other code that simply allows client 102 to contact the appropriate network service 116 at a well-known or easily determined location on network 111 (e.g., a known URL or IP address). Other messages 316 may include a payload portion that is provided from network service 116 as part of message 314. In embodiments that support this feature, the payload may be formatted and relayed to client 102 as appropriate. Other types of messages 316 may be formulated and transmitted in other embodiments.

After message 316 is sent, message server 114 may take any of various actions based upon the success or failure of message delivery to client 102. In some implementations, client 102 acknowledges message receipt with an acknowledgement message 318. This acknowledgement may be relayed back to the network service 116 in some embodiments. If no acknowledgement 318 is received, message server 114 may provide a timeout message 322 to network service 116 after an appropriate period of time. The "appropriate period" may be any pre-determined time period that is appropriately set for the particular application and network environment. In some embodiments, the appropriate period may be configured by an administrator. Some implementations may support additional message types, such as negative acknowledgements (NAK) for unsuccessful attempts to contact the recipient, "busy" messages if communications are already in progress, "invalid" messages if incorrectly formatted or otherwise invalid messages are received, and/or the like.

Client 102 processes the received message 316 as appropriate for the particular message 316 (function 324). In various embodiments, client 102 simply parses a service identifier or other code contained within the body of the message 316 to contact the associated network service 116. In such cases, client 102 suitably transmits a second TCP (or similar) request 326 directly to the server to establish an interaction session 328. Session 328 may be maintained on any temporary or persistent basis, and may be continued for any duration. In some implementations, the interaction 328 will be relatively short (e.g., if network service 116 simply wishes to provide brief instructions to client 102), whereas other connections may be more ongoing (e.g., if network service 116 is receiving, redirecting or otherwise processing a media stream from client 102).

In some cases (or for other types of messages 316), interaction 328 may not be needed if message 316 contains enough information to provoke the desired response in client 102. Certain embodiments may provide "payload" messages, for example, that allow client 102 to extract and process a payload contained within the message 316 as appropriate. Still other messages 316 may provide a service identifier or other code that can be interpreted by client 102 to produce an appropriate response.

Generally speaking, the various tasks shown in connection with process 300 may be carried out with any sort of hardware, software and/or firmware logic within system 100. Portions of process 300 may be carried out, for example, by a message server 114 (FIG. 1) operating in conjunction with any appropriate client 102 and/or network service 116 as appropriate. In various embodiments, the various steps of process 300 are carried out in response to software or firmware instructions stored in a memory, or on a disk drive and/or other storage associated with message server 114, load balancer 112, network service 116 and/or client 102. Such instructions may be executed by any processor and/or other processing features within message server 114, client 102, load balancers 112 and 118, network service 116 and/or the like as indicated in FIG. 3. The particular means used to implement each of the various functions shown in FIG. 3, then, could be any sort of processing hardware (such as hardware associated with message server 114, client 102, load balancers 112 and 118, and/or network service 116 of FIG. 1) executing conventional software logic in any format that implements the various algorithms and techniques described herein.

Various examples of systems, devices and processes for establishing connections between clients and servers over a digital network have been described. Several of the exemplary techniques described herein allow clients and servers to initially establish persistent TCP or other connections with a message server. This connection may be used by any network service to support features associated with placeshifting, media playing, gaming and/or any other networked applications. For example, connections to clients located behind firewalls or other security mechanisms can be established in real-time (or near real-time) in a flexible yet efficient manner. This pre-established connection can be used for any number of applications. As an example, a network customer service application could use the pre-established connection to direct a particular client device to contact a server that allows a customer service representative to remotely configure the client device. Other embodiments may provide other services, such as remote programming (e.g., remote programming of a DVR or similar device), remote establishment of relay connections (e.g., between a client device and a media player or the like), or any other online interaction with the client device. Many other network services could be provided for placeshifting, media streaming, gaming, remote programming, remote monitoring, remote configuration and/or any number of other applications. Other embodiments may exhibit other benefits and features as well.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a message server to allow a first device operating on a network to contact a second device that is operating behind a firewall on a network, the method comprising:
   receiving a first request at the message server from the second device operating behind the firewall that identifies the second device that is operating behind the firewall;
   establishing a connection between the message server and the second device that is operating behind the firewall in response to the first request;
   maintaining the connection as a persistent connection between the message server and the second device that is operating behind the firewall;
   after the persistent connection is established, receiving a second request from the first device at the message server, wherein the second request identifies the second device that is operating behind the firewall;
   in response to the second request, transmitting a message from the message server to the second device that is operating behind the firewall over the persistent connection previously established between the message server and the second device that is operating behind the firewall.

2. The method of claim 1 wherein the message from the message server to the second device that is operating behind the firewall directs the second device to establish an outgoing connection from behind the firewall to communicate with the first device.

3. The method of claim 1 wherein the maintaining comprises transmitting keep-alive messages to the client via the persistent connection.

4. The method of claim 3 wherein the connection is a transmission control protocol (TCP) connection.

5. The method of claim 1 further comprising receiving a first acknowledgement message at the message server from the second device that is operating behind the firewall, and, in response to the first acknowledgement message, transmitting a second acknowledgement message from the message server to the first device.

6. The method of claim 1 further comprising transmitting a timeout message from the message server to the second device that is operating behind the firewall if an acknowledgement message from the second device is not received at the message server within a pre-determined time following the transmitting of the message.

7. The method of claim 1 wherein second device that is operating behind the firewall is configured to provide programming instructions to a digital video recorder associated with a user of the first device.

8. The method of claim 1 wherein the second request identifies the first device and comprises a payload that contains the message.

9. The method of claim 1 wherein the message comprises a code that identifies the first device to the second device.

10. The method of claim 1 wherein the second device that is operating behind the firewall is a placeshifting device, and wherein the message identifies the first device to the placeshifting device to thereby allow the placeshifting device to directly contact the first device through the firewall.

11. A system to process messages from at least one service host to a plurality of devices that are each operating behind firewalls on a network, the system comprising:
   a plurality of message servers; and
   a load balancer configured to receive connection requests from each of the plurality of devices that are operating behind firewalls, wherein the load balancer is configured to assign each of the connection requests to one of the plurality of message servers and wherein each message server is configured to establish and maintain persistent connections with at least some of the plurality of devices that are operating behind firewalls, to receive the messages from the at least one service host, and to transmit the messages to the at least some of the plurality of devices that are operating behind firewalls over the persistent connections.

12. The system of claim 11 wherein the load balancer is further configured to determine information about each of the plurality of devices that are operating behind firewalls based upon the connection requests, and to assign each of the connection requests based upon the information.

13. The system of claim 12 wherein the information about each of the device operating behind firewalls comprises a type of device, and wherein the load balancer is configured to determine the type of device from an identifier contained in one of the connection requests.

14. The system of claim 11 wherein the load balancer is further configured to determine location information about each of the devices that are operating behind firewalls based upon the connection requests, and to assign each of the connection requests based upon the location information.

15. The system of claim 14 wherein the load balancer is further configured to determine the location information about each of the devices that are operating behind firewalls from network addresses associated with the connection requests.

16. The system of claim 11 wherein each of the persistent connections are established in response to one of the plurality of message servers receiving an assigned connection request from the load balancer.

17. The system of claim 11 further comprising a service load balancer configured to receive each of the messages from the at least one service host and to direct each of the messages to one of the plurality of message servers that maintains the persistent connection to one of the devices that are operating behind firewalls identified in the message.

18. A method executable by a message server to establish an interaction between a first device and a second device via a network, wherein the second device operates behind a firewall from the network, the method comprising:
   maintaining a persistent connection between the message server and the second device operating behind the firewall;
   receiving a first request identifying the first device by the message server;
   in response to the second request, transmitting a message from the assigned one of the plurality of message servers to the client over the persistent connection, wherein the message comprises information that allows the client to contact the first server and thereby establish the interaction between the first server and the client.

19. The method of claim 18 further comprising selecting the assigned one of the plurality of message servers based upon the client identified in the second request.

20. The method of claim 18 wherein the assigned one of the plurality of message servers is selected at least in part by at least one of a client type or a client location.

* * * * *